United States Patent
Liu et al.

(10) Patent No.: US 10,518,435 B2
(45) Date of Patent: Dec. 31, 2019

(54) FEEDING SYSTEM WITH NUMERICALLY ADJUSTABLE PNEUMATIC CYLINDER SPEEDS

(71) Applicant: OAV EQUIPMENT AND TOOLS, INC., Taichung (TW)

(72) Inventors: Hsuan-Chu Liu, Taichung (TW); Long-Chang Jan, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 366 days.

(21) Appl. No.: 15/672,477

(22) Filed: Aug. 9, 2017

(65) Prior Publication Data
US 2018/0370067 A1 Dec. 27, 2018

(30) Foreign Application Priority Data

Jun. 22, 2017 (TW) .............................. 106120921 A

(51) Int. Cl.
*B27C 5/06* (2006.01)
(52) U.S. Cl.
CPC ..................................... *B27C 5/06* (2013.01)
(58) Field of Classification Search
CPC ......... B27B 25/00; B27B 25/02; B27B 25/08; B27B 3/14; B27B 3/16; B27B 5/065; B27B 31/00; B27B 31/003; B23D 47/04; B23D 47/042; B23D 47/045; B23D 47/047; B23D 51/04; B23D 51/043; B23D 51/046; B27C 5/02; B27C 5/04; B27C 5/06
See application file for complete search history.

(56) References Cited

U.S. PATENT DOCUMENTS 6,340,039 B1 * 1/2002 Chang .................... B23Q 3/002
144/135.2

* cited by examiner

*Primary Examiner* — Matthew Katcoff
(74) *Attorney, Agent, or Firm* — Muncy, Geissler, Olds & Lowe, P.C.

(57) ABSTRACT

A feeding system with numerically adjustable pneumatic cylinder speeds includes: a frame; an X-axis pneumatic cylinder; a Z-axis pneumatic cylinder; a feeding table connected to the pneumatic cylinders in order to be driven into motion in the X- and Z-axis directions; an X-axis detection module; a Z-axis detection module; a microcomputer; and a display screen electrically connected to the microcomputer. The microcomputer uses each detection module to determine the time interval between the instant at which the piston rod of the corresponding pneumatic cylinder passes the corresponding starting point and a subsequent instant at which the same piston rod passes the corresponding endpoint. The time intervals thus determined are defined as a duration of X-axis forward movement and a duration of Z-axis forward movement respectively. Both durations are displayed on the display screen.

7 Claims, 7 Drawing Sheets

FEEDING SYSTEM WITH NUMERICALLY ADJUSTABLE PNEUMATIC CYLINDER SPEEDS

BACKGROUND OF THE INVENTION

1. Technical Field

The present invention relates to a mechanical feeding technique that employs pneumatic cylinders. More particularly, the invention relates to a feeding system in which the pneumatic cylinder speeds are numerically adjustable.

2. Description of Related Art

The conventional pneumatic cylinder-based feeding systems, such as the cutter feeding system of a woodworking router, use pneumatic cylinders as the feeding means. For example, a cutter is provided on a feeding table and driven by both X- and Z-axis pneumatic cylinders in order to perform a routing operation on a wood workpiece.

The speed of each pneumatic cylinder in such a feeding system must be properly adjusted before shipment, or the cutter to be fed may move too fast or too slow, resulting in low woodworking quality. Nowadays, however, the adjustment is typically made by a factory worker based on observation and experience, without an effective standard operating procedure to follow.

BRIEF SUMMARY OF THE INVENTION

The primary objective of the present invention is to provide a feeding system that features numerically adjustable pneumatic cylinder speeds and that, more specifically, converts the speed of each pneumatic cylinder into a value to facilitate adjustment by an operator.

To achieve the above objective, the present invention provides a feeding system having numerically adjustable pneumatic cylinder speeds. The feeding system includes: a frame; an X-axis pneumatic cylinder provided at the frame and having a piston rod to be moved parallel to the X axis; a Z-axis pneumatic cylinder provided at the frame and having a piston rod to be moved parallel to the Z axis; a feeding table connected to the piston rod of the X-axis pneumatic cylinder and the piston rod of the Z-axis pneumatic cylinder in order to be driven into motion by the piston rods in the X-axis direction and the Z-axis direction; an X-axis detection module for detecting whether the piston rod of the X-axis pneumatic cylinder passes the corresponding starting point and the corresponding endpoint; a Z-axis detection module for detecting whether the piston rod of the Z-axis pneumatic cylinder passes the corresponding starting point and the corresponding endpoint; a microcomputer electrically connected to the X-axis detection module, the Z-axis detection module, the X-axis pneumatic cylinder, and the Z-axis pneumatic cylinder in order to control the X-axis pneumatic cylinder and the Z-axis pneumatic cylinder and thereby drive the feeding table into motion; and a display screen electrically connected to the microcomputer. The microcomputer uses the X-axis detection module to determine the time interval between the instant at which the piston rod of the X-axis pneumatic cylinder passes the corresponding starting point and a subsequent instant at which the same piston rod passes the corresponding endpoint, wherein the time interval is defined as a duration of X-axis forward movement. Similarly, the microcomputer uses the Z-axis detection module to determine the time interval between the instant at which the piston rod of the Z-axis pneumatic cylinder passes the corresponding starting point and a subsequent instant at which the same piston rod passes the corresponding endpoint, and this time interval is defined as a duration of Z-axis forward movement. The microcomputer displays the duration of X-axis forward movement and the duration of Z-axis forward movement on the display screen.

The feeding system of the present invention converts the speeds of the X-axis pneumatic cylinder and of the Z-axis pneumatic cylinder into values and displays the values on the display screen so that an operator can make necessary adjustment accordingly.

DETAILED DESCRIPTION OF THE INVENTION

To demonstrate the technical features of the present invention, a preferred embodiment is described below with reference to the accompanying drawings.

Figure 1:
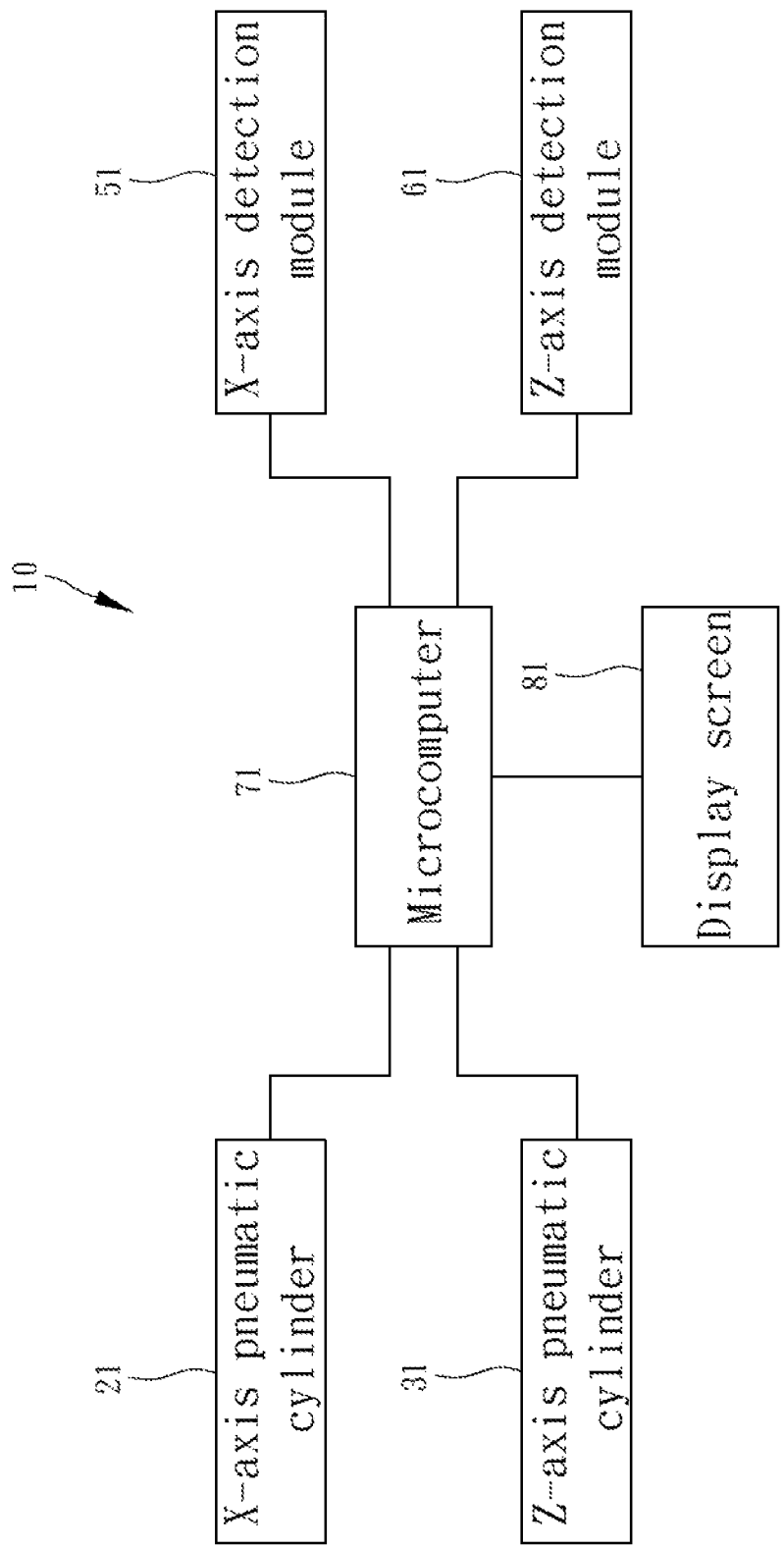
FIG. 1 is a block diagram of the feeding system in a preferred embodiment of the present invention.
Figure 2:
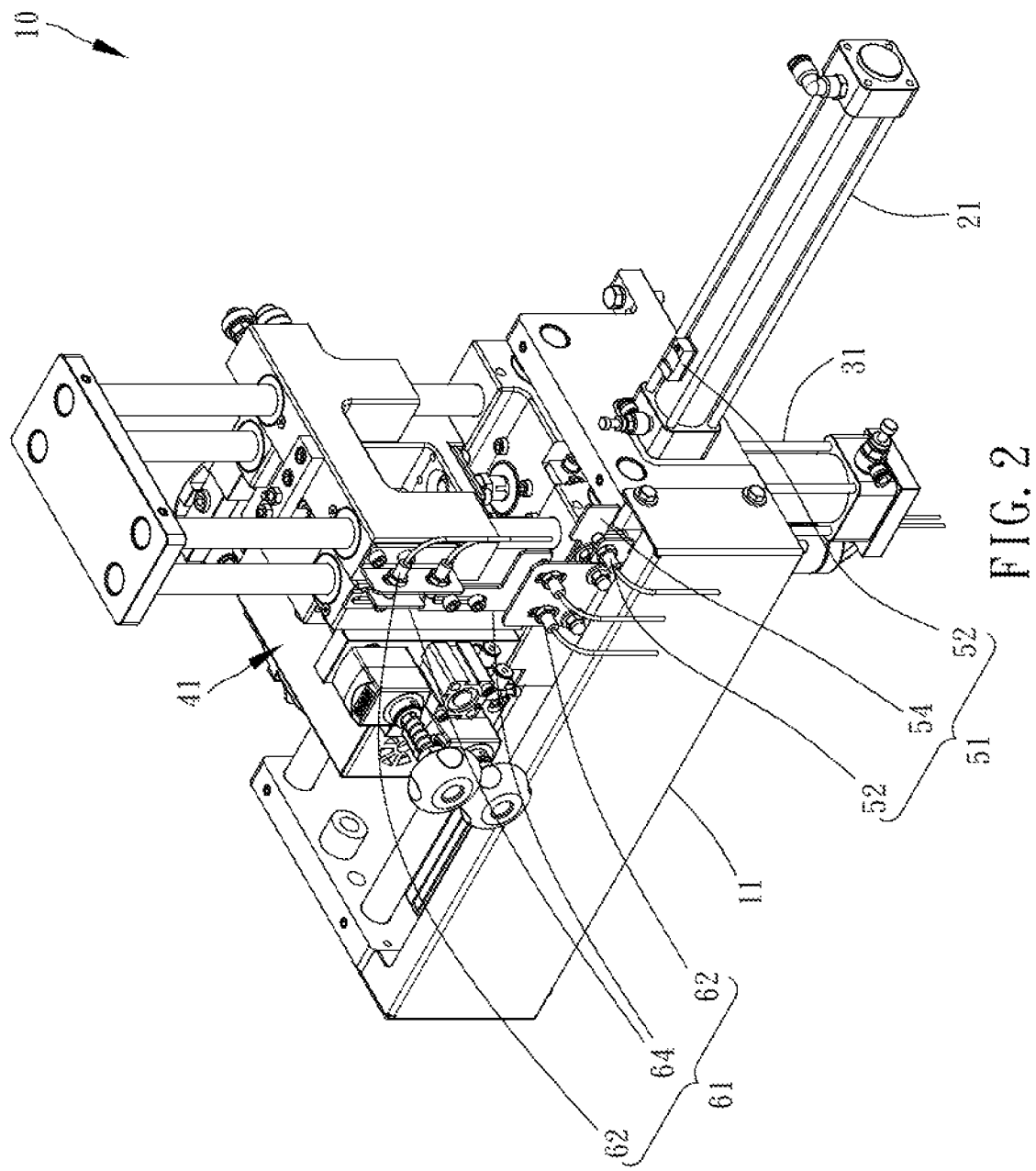
FIG. 2 is a perspective view of the feeding system in FIG. 1.
Figure 3:
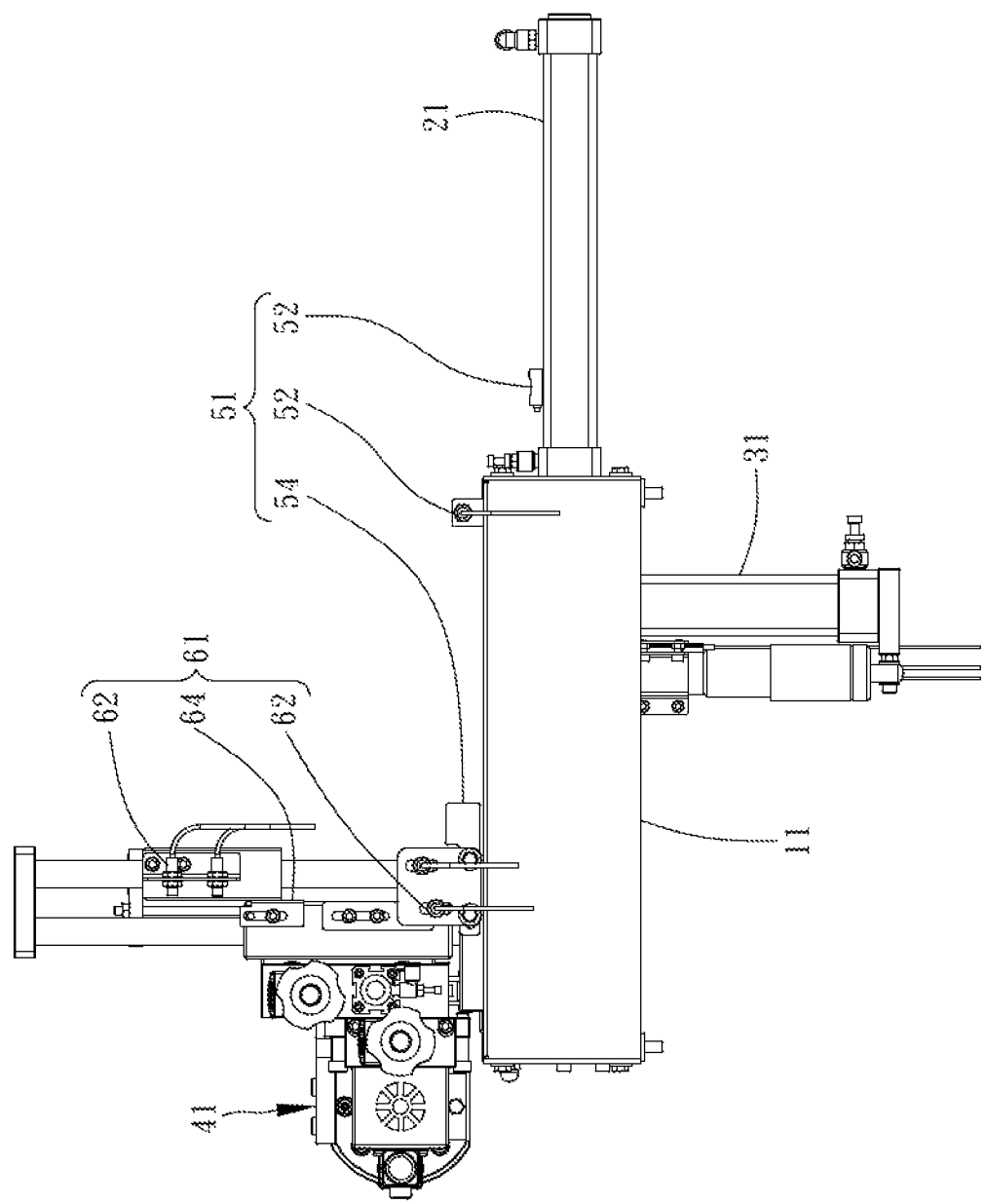
FIG. 3 is a front view of the feeding system in FIG. 1.

Referring to FIG. 1 to FIG. 3, the feeding system 10 in a preferred embodiment of the present invention has numerically adjustable pneumatic cylinder speeds and is composed essentially of a frame 11, an X-axis pneumatic cylinder 21, a Z-axis pneumatic cylinder 31, a feeding table 41, an X-axis detection module 51, a Z-axis detection module 61, a microcomputer 71, and a display screen 81.

The X-axis pneumatic cylinder 21 is provided at the frame 11 and has a piston rod (not shown) configured to be moved parallel to the X-axis.

The Z-axis pneumatic cylinder 31 is also provided at the frame 11 and has a piston rod (not shown) configured to be moved parallel to the Z-axis.

The feeding table 41 is connected to the piston rod of the X-axis pneumatic cylinder 21 and the piston rod of the Z-axis pneumatic cylinder 31 in order to be driven by the piston rods and thus moved in the X-axis direction and the Z-axis direction.

The X-axis detection module 51 is configured to detect whether the piston rod of the X-axis pneumatic cylinder 21 passes the corresponding starting point and the corresponding endpoint.

Likewise, the Z-axis detection module 61 is configured to detect whether the piston rod of the Z-axis pneumatic cylinder 31 passes the corresponding starting point and the corresponding endpoint.

When implementing the present invention, the X-axis detection module 51 may be configured as a combination of two X-axis detectors 52 and two X-axis to-be-detected objects 54, and the Z-axis detection module 61, as a combination of two Z-axis detectors 62 and one Z-axis to-be-detected object 64. One of the X-axis to-be-detected objects 54 is provided at the feeding table 41 while the piston ring (not shown) of the X-axis pneumatic cylinder 21 serves as the other X-axis to-be-detected object 54. The two X-axis detectors 52 are provided at the frame 11 and the cylinder body of the X-axis pneumatic cylinder 21 respectively, indicating the positions of the starting point and the endpoint corresponding to the piston rod of the X-axis pneumatic cylinder 21 respectively. The Z-axis to-be-detected object 64 is provided at the feeding table 41. The two Z-axis detectors 62 are provided at the frame 11 to indicate the positions of the starting point and the endpoint corresponding to the piston rod of the Z-axis pneumatic cylinder 31 respectively. Each pair of detected starting point and detected endpoint, therefore, can be viewed respectively as the positions where the starting point and the endpoint of the corresponding piston rod lie. As the X-axis pneumatic cylinder 21 and the Z-axis pneumatic cylinder 31 are provided at the frame 11, with their cylinder bodies fixed to the frame 11, the cylinders can be viewed as a part of the overall construction of the frame 11.

In addition, when carrying out the present invention, the X-axis detectors 52 and the Z-axis detectors 62 may be implemented as metal detectors, and the X-axis to-be-detected objects 54 and the Z-axis to-be-detected object 64 may each be implemented as a metal plate or a piston ring, in order to produce the intended detection results. Moreover, there may be a plurality of X-axis to-be-detected objects 54 corresponding respectively to the X-axis detectors 52 and a plurality of Z-axis to-be-detected objects 64 corresponding respectively to the Z-axis detectors 62. In that case, however, the plural X-axis to-be-detected objects 54 can be viewed as a single one because they are all provided at and therefore movable along with the feeding table 41, and the plural Z-axis to-be-detected objects 64 can also be viewed as a single one because they, too, are provided at and hence movable along with the feeding table 41. It should be pointed out that the foregoing combinations of detectors and to-be-detected objects may be replaced by combinations of Hall effect devices and magnets. For example, the X-axis detectors 52 and the Z-axis detectors 62 may be Hall effect devices while the X-axis to-be-detected objects 54 and the Z-axis to-be-detected object 64 are magnets. Detection devices such as photo interrupters and limit switches may be used instead as well.

The microcomputer 71 is electrically connected to the X-axis detection module 51, the Z-axis detection module 61, the X-axis pneumatic cylinder 21, and the Z-axis pneumatic cylinder 31 in order to drive the feeding table 41 into motion by controlling the X-axis pneumatic cylinder 21 and the Z-axis pneumatic cylinder 31.

The display screen 81 is electrically connected to the microcomputer 71.

The microcomputer 71 uses the X-axis detection module 51 to determine the time interval between the instant at which the piston rod of the X-axis pneumatic cylinder 21 passes the corresponding starting point and a subsequent instant at which the same piston rod passes the corresponding endpoint, wherein the time interval is defined as a duration T1 of X-axis forward movement. The microcomputer 71 also uses the Z-axis detection module 61 to determine the time interval between the instant at which the piston rod of the Z-axis pneumatic cylinder 31 passes the corresponding starting point and a subsequent instant at which the same piston rod passes the corresponding endpoint, and this time interval is defined as a duration T2 of Z-axis forward movement. The microcomputer 71 displays the duration T1 of X-axis forward movement and the duration T2 of Z-axis forward movement on the display screen 81.

The aforesaid movements refer to the piston rods of the pneumatic cylinders advancing from their respective corresponding starting points to their respective corresponding endpoints. In the course in which the piston rod of the X-axis pneumatic cylinder 21 returns from the corresponding endpoint to the corresponding starting point, the microcomputer 71 uses the X-axis detection module 51 to determine a duration T3 of X-axis backward movement, i.e., the time interval between the instant at which the piston rod of the X-axis pneumatic cylinder 21 passes the corresponding endpoint and a subsequent instant at which the same piston rod passes the corresponding starting point. Similarly, in the course in which the piston rod of the Z-axis pneumatic cylinder 31 returns from the corresponding endpoint to the corresponding starting point, the microcomputer 71 uses the Z-axis detection module 61 to determine a duration T4 of Z-axis backward movement, i.e., the time interval between the instant at which the piston rod of the Z-axis pneumatic cylinder 31 passes the corresponding endpoint and a subsequent instant at which the same piston rod passes the corresponding starting point. The microcomputer 71 displays the duration T3 of X-axis backward movement and the duration T4 of Z-axis backward movement on the display screen 81, too.

In addition, while the piston rods of the X-axis pneumatic cylinder 21 and of the Z-axis pneumatic cylinder 31 are both moving from their respective corresponding starting points to their respective corresponding endpoints, timing starts when one of the X-axis detection module 51 and the Z-axis detection module 61 detects that the piston rod of a corresponding one of the X-axis pneumatic cylinder 21 and the Z-axis pneumatic cylinder 31 passes the corresponding starting point, and timing stops when both the piston rods of the X-axis pneumatic cylinder 21 and of the Z-axis pneumatic cylinder 31 have passed their respective corresponding endpoints. The timed period thus obtained is defined as a duration T5 of X- and Z-axis forward movement and is displayed on the display screen 81. Conversely, while the piston rods of the X-axis pneumatic cylinder 21 and of the Z-axis pneumatic cylinder 31 are both returning from their respective corresponding endpoints to their respective corresponding starting points, timing starts when one of the X-axis detection module 51 and the Z-axis detection module 61 detects that the piston rod of a corresponding one of the X-axis pneumatic cylinder 21 and the Z-axis pneumatic cylinder 31 passes the corresponding endpoint, and timing stops when both the piston rods of the X-axis pneumatic cylinder 21 and of the Z-axis pneumatic cylinder 31 have passed their respective corresponding starting points. The timed period thus obtained is defined as a duration T6 of X- and Z-axis backward movement and is also displayed on the display screen 81.

Having described the structure of the invention, the present specification continues to describe how the invention works.

Referring to FIG. 3 to FIG. 7, a user can control the X-axis pneumatic cylinder 21 and the Z-axis pneumatic cylinder 31 via the microcomputer 71 in order to drive the feeding table 41 into motion.

Figure 4:
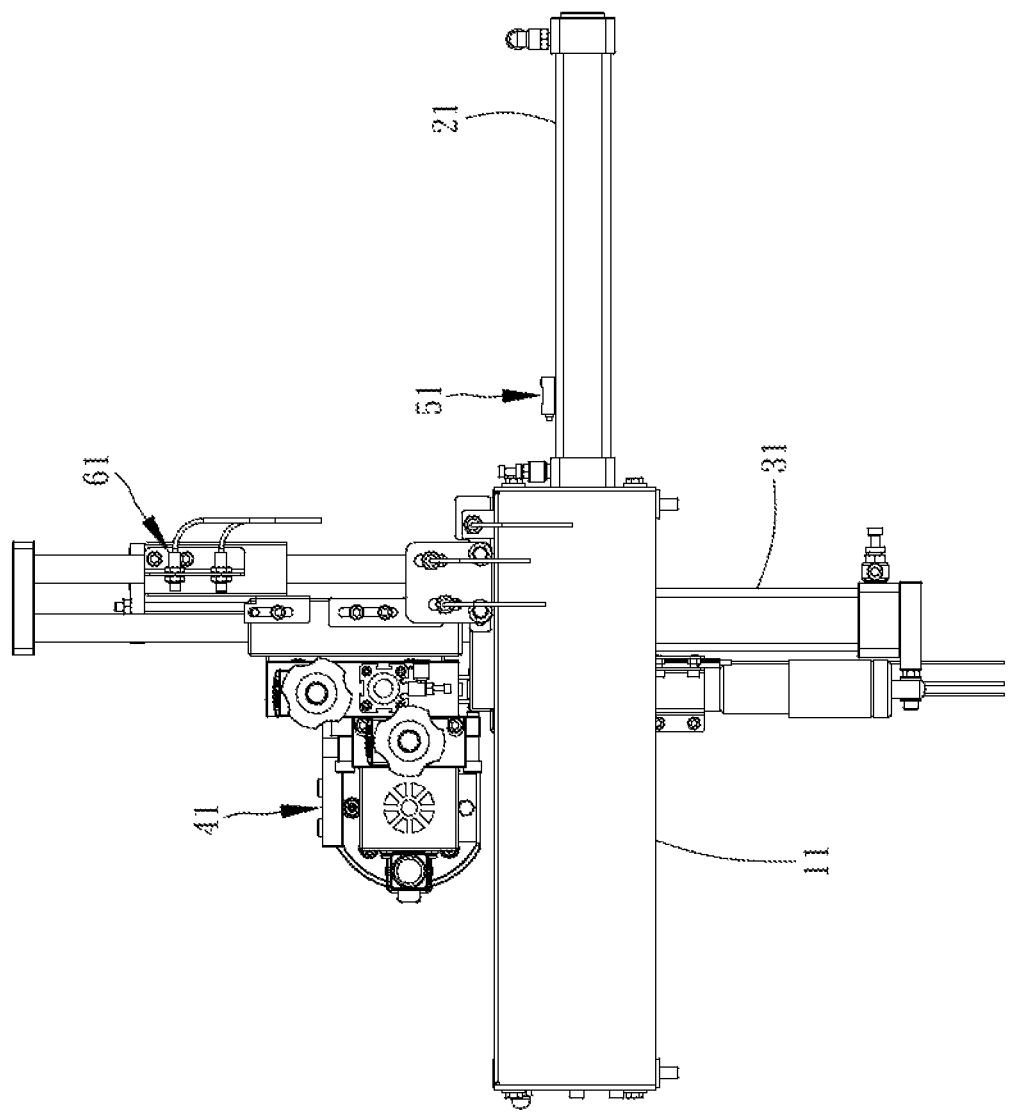
FIG. 4 is similar to FIG. 3, showing a state of use of the feeding system in FIG. 1.

To determine the duration T1 of X-axis forward movement, referring to FIG. 3 and FIG. 4, an operator only has to advance the feeding table 41 along the X axis, i.e., from the position in FIG. 3 to the position in FIG. 4, and the X-axis detection module 51 will detect the passing of the piston rod of the X-axis pneumatic cylinder 21 across the corresponding starting point, followed by the corresponding endpoint, in order for the microcomputer 71 to obtain the time interval therebetween, i.e., the duration T1 of X-axis forward movement, and display the duration T1 on the display screen 81, allowing the operator to know whether the current speed is normal and, if not, make necessary adjustment accordingly.

Figure 5:
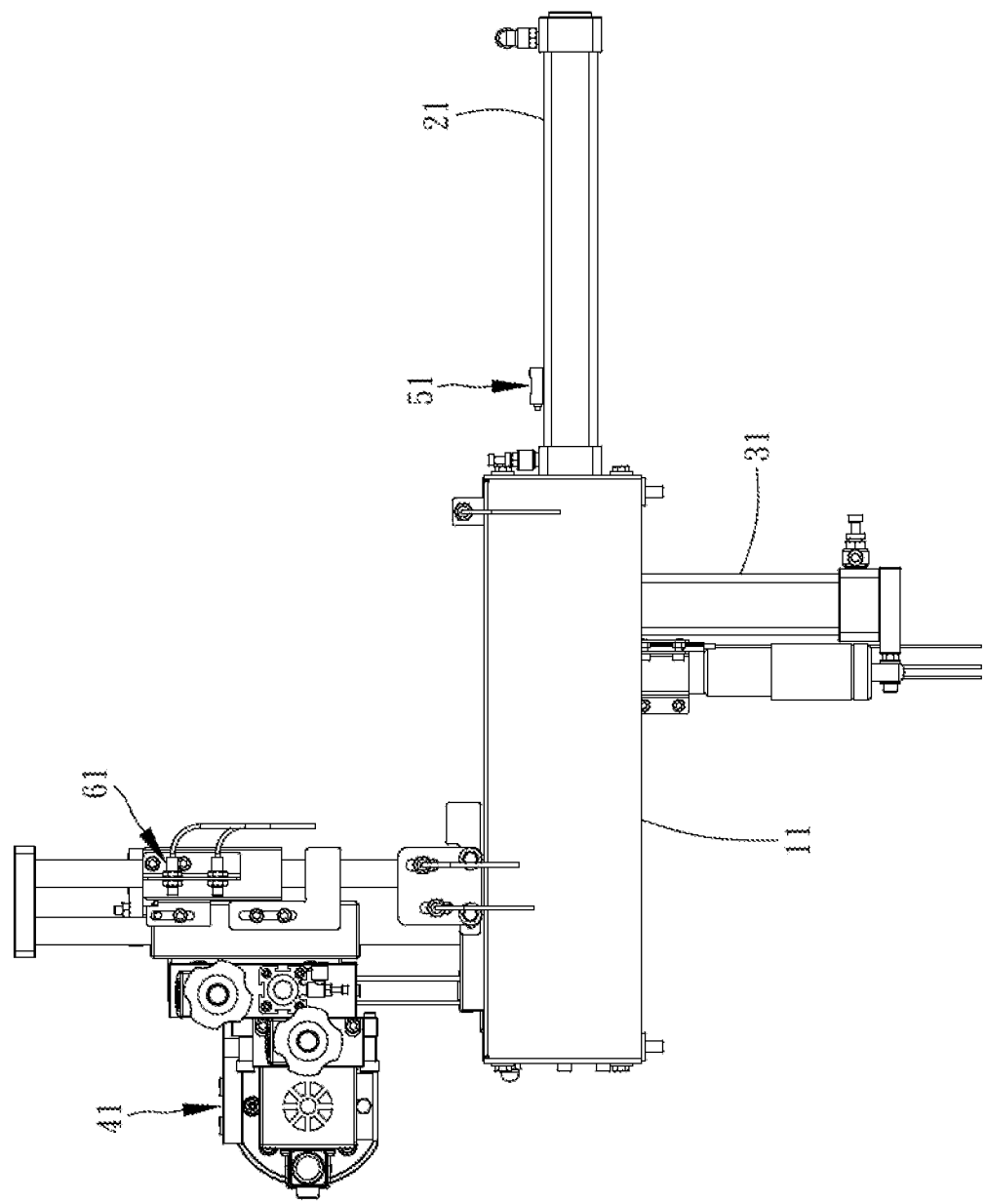
FIG. 5 is similar to FIG. 4, showing another state of use of the feeding system in FIG. 1.

To determine the duration T2 of Z-axis forward movement (i.e., the duration of upward movement), the operator only has to advance the feeding table 41 along the Z axis, i.e., from the position in FIG. 3 to the position in FIG. 5, and the Z-axis detection module 61 will detect the passing of the piston rod of the Z-axis pneumatic cylinder 31 across the corresponding starting point, followed by the corresponding endpoint, in order for the microcomputer 71 to obtain the time interval therebetween, which is the duration T2 of Z-axis forward movement.

To determine the duration T3 of X-axis backward movement, the operator only has to move the feeding table 41 backward along the X axis, i.e., from the position in FIG. 4 to the position in FIG. 3, and the X-axis detection module 51 will detect the passing of the piston rod of the X-axis pneumatic cylinder 21 across the corresponding endpoint, followed by the corresponding starting point, in order for the microcomputer 71 to obtain the time interval therebetween, which is the duration T3 of X-axis backward movement.

To determine the duration T4 of Z-axis backward movement (i.e., the duration of downward movement), the operator only has to move the feeding table 41 backward along the Z axis, i.e., from the position in FIG. 5 to the position in FIG. 3, and the Z-axis detection module 61 will detect the passing of the piston rod of the Z-axis pneumatic cylinder 31 across the corresponding endpoint, followed by the corresponding starting point, in order for the microcomputer 71 to obtain the time interval therebetween, which is the duration T4 of Z-axis backward movement.

Figure 6:
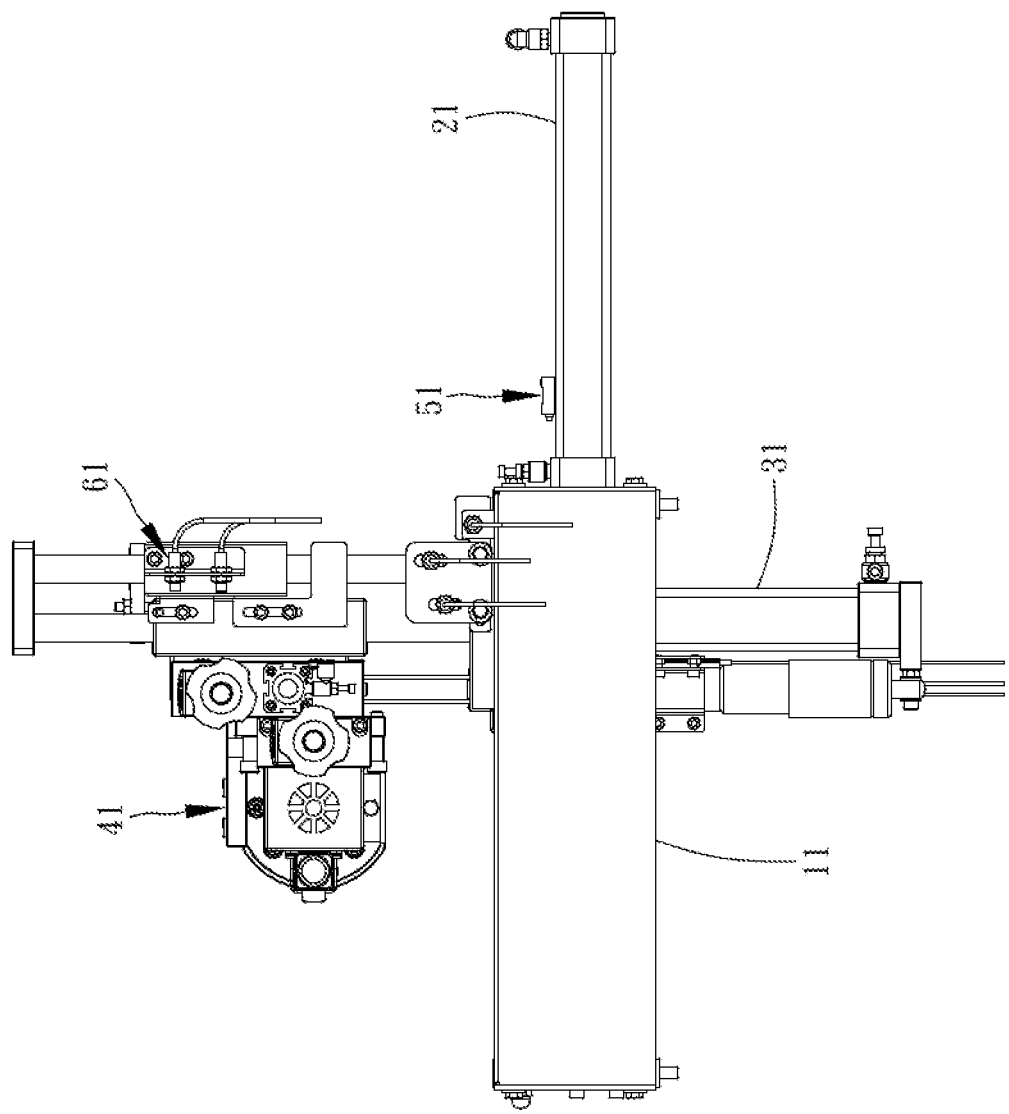
FIG. 6 is similar to FIG. 5, showing still another state of use of the feeding system in FIG. 1.

To determine the duration T5 of X- and Z-axis forward movement, the operator advances the feeding table 41 along the X axis and the Z axis, i.e., from the position in FIG. 3 to the position in FIG. 6. Timing starts as soon as one of the X-axis detection module 51 and the Z-axis detection module 61 detects that the piston rod of a corresponding one of the X-axis pneumatic cylinder 21 and the Z-axis pneumatic cylinder 31 passes the corresponding starting point, and timing stops when the piston rods of both the X-axis pneumatic cylinder 21 and the Z-axis pneumatic cylinder 31 have passed their respective corresponding endpoints. The microcomputer 71 defines the timed period as the duration T5 of X- and Z-axis forward movement and displays the duration T5 on the display screen 81.

To determine the duration T6 of X- and Z-axis backward movement, the operator moves the feeding table 41 backward along the X axis and the Z axis, i.e., from the position in FIG. 6 to the position in FIG. 3. Timing starts as soon as one of the X-axis detection module 51 and the Z-axis detection module 61 detects that the piston rod of a corresponding one of the X-axis pneumatic cylinder 21 and the Z-axis pneumatic cylinder 31 passes the corresponding endpoint, and timing stops when the piston rods of both the X-axis pneumatic cylinder 21 and the Z-axis pneumatic cylinder 31 have passed their respective corresponding starting points. The microcomputer 71 defines the timed period as the duration T6 of X- and Z-axis backward movement and displays the duration T6 on the display screen 81.

Figure 7:
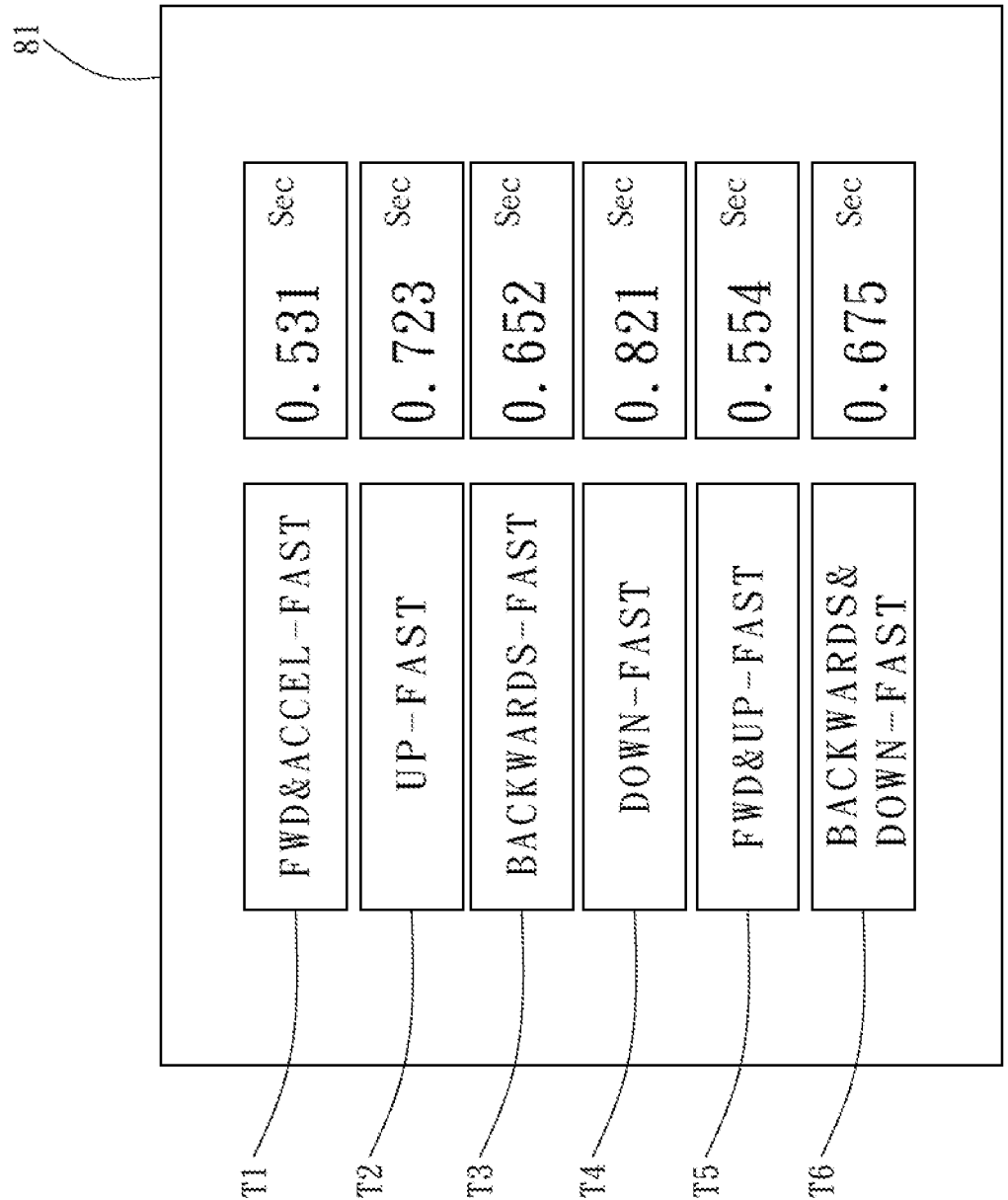
FIG. 7 schematically shows a screen image displayed by the feeding system in FIG. 1.

Referring to FIG. 7, the display screen 81 displays the results of the above operations, namely the duration T1 of X-axis forward movement, the duration T2 of Z-axis forward movement, the duration T3 of X-axis backward movement, the duration T4 of Z-axis backward movement, the duration T5 of X- and Z-axis forward movement, and the duration T6 of X- and Z-axis backward movement. The values displayed inform the user of whether the speeds of the X-axis pneumatic cylinder 21 and of the Z-axis pneumatic cylinder 31 comply with the standard in use so that adjustment, if needed, can be carried out accordingly.

It should be added that the X-axis detectors 52 and the X-axis to-be-detected objects 54 in the present invention may swap positions, and so may the Z-axis detectors 62 and the Z-axis to-be-detected object 64. The positions of the detectors and of the to-be-detected objects are not limited to those disclosed herein.

It can be known from the above that, by converting the speed of each pneumatic cylinder into a value, the present invention makes it easier for an operator to adjust the pneumatic cylinder speeds. This helps standardize the adjusted speeds and thereby ensures consistency in product quality and high product yield.

What is claimed is:

1. A feeding system with numerically adjustable pneumatic cylinder speeds, comprising:
a frame;
an X-axis pneumatic cylinder provided at the frame and having a piston rod movable parallel to an X axis;
a Z-axis pneumatic cylinder provided at the frame and having a piston rod movable parallel to a Z axis;
a feeding table connected to the piston rod of the X-axis pneumatic cylinder and the piston rod of the Z-axis pneumatic cylinder in order to be driven into motion by the piston rods in an X-axis direction and a Z-axis direction;
an X-axis detection module for detecting whether the piston rod of the X-axis pneumatic cylinder passes a corresponding starting point and a corresponding endpoint;
a Z-axis detection module for detecting whether the piston rod of the Z-axis pneumatic cylinder passes a corresponding starting point and a corresponding endpoint;
a microcomputer electrically connected to the X-axis detection module, the Z-axis detection module, the X-axis pneumatic cylinder, and the Z-axis pneumatic cylinder in order to drive the feeding table into motion by controlling the X-axis pneumatic cylinder and the Z-axis pneumatic cylinder; and
a display screen electrically connected to the microcomputer;
wherein the microcomputer uses the X-axis detection module to determine a first time interval between an instant at which the piston rod of the X-axis pneumatic cylinder passes the corresponding starting point and a subsequent instant at which the piston rod of the X-axis pneumatic cylinder passes the corresponding endpoint, the first time interval being defined as a duration of X-axis forward movement; the microcomputer uses the Z-axis detection module to determine a second time interval between an instant at which the piston rod of the Z-axis pneumatic cylinder passes the corresponding starting point and a subsequent instant at which the piston rod of the Z-axis pneumatic cylinder passes the corresponding endpoint, the second time interval being defined as a duration of Z-axis forward movement; and the microcomputer displays the duration of X-axis forward movement and the duration of Z-axis forward movement on the display screen.

2. The feeding system of claim 1, wherein the X-axis detection module comprises two X-axis detectors and an X-axis to-be-detected object, and the Z-axis detection module comprises two Z-axis detectors and a Z-axis to-be-detected object.

3. The feeding system of claim 2, wherein the X-axis to-be-detected object is provided at the feeding table, the two X-axis detectors are provided at the frame and correspond respectively in position to the starting point and the endpoint corresponding to the piston rod of the X-axis pneumatic cylinder, the Z-axis to-be-detected object is provided at the feeding table, and the two Z-axis detectors are provided at the frame and correspond respectively in position to the starting point and the endpoint corresponding to the piston rod of the Z-axis pneumatic cylinder.

4. The feeding system of claim 2, wherein the X-axis detectors are metal detectors, the X-axis to-be-detected object is a metal plate, the Z-axis detectors are metal detectors, and the Z-axis to-be-detected object is a metal plate.

5. The feeding system of claim 2, wherein the X-axis detectors are Hall effect devices, the X-axis to-be-detected object is a magnet, the Z-axis detectors are Hall effect devices, and the Z-axis to-be-detected object is a magnet.

6. The feeding system of claim 1, wherein while the piston rod of the X-axis pneumatic cylinder is returning from the corresponding endpoint to the corresponding starting point, the microcomputer uses the X-axis detection module to determine a third time interval between an instant at which the piston rod of the X-axis pneumatic cylinder passes the corresponding endpoint and a subsequent instant at which the piston rod of the X-axis pneumatic cylinder passes the corresponding starting point, the third time interval being defined as a duration of X-axis backward movement; while the piston rod of the Z-axis pneumatic cylinder is returning from the corresponding endpoint to the corresponding starting point, the microcomputer uses the Z-axis detection module to determine a fourth time interval between an instant at which the piston rod of the Z-axis pneumatic cylinder passes the corresponding endpoint and a subsequent instant at which the piston rod of the Z-axis pneumatic cylinder passes the corresponding starting point, the fourth time interval being defined as a duration of Z-axis backward movement; and the microcomputer displays the duration of X-axis backward movement and the duration of Z-axis backward movement on the display screen.

7. The feeding system of claim 1, wherein while the piston rods of the X-axis pneumatic cylinder and of the Z-axis pneumatic cylinder are both moving from the respective corresponding starting points to the respective corresponding endpoints, timing starts when one of the X-axis detection module and the Z-axis detection module detects that the piston rod of a corresponding one of the X-axis pneumatic cylinder and the Z-axis pneumatic cylinder passes the corresponding starting point, and said timing stops when the piston rods of the X-axis pneumatic cylinder and of the Z-axis pneumatic cylinder both have passed the respective corresponding endpoints, resulting in a timed period defined as a duration of X- and Z-axis forward movement, the duration of X- and Z-axis forward movement being displayed on the display screen; and while the piston rods of the X-axis pneumatic cylinder and of the Z-axis pneumatic cylinder are both returning from the respective corresponding endpoints to the respective corresponding starting points, timing starts when one of the X-axis detection module and the Z-axis detection module detects that the piston rod of a corresponding one of the X-axis pneumatic cylinder and the Z-axis pneumatic cylinder passes the corresponding endpoint, and said timing stops when the piston rods of the X-axis pneumatic cylinder and of the Z-axis pneumatic cylinder both have passed the respective corresponding starting points, resulting in a timed period defined as a duration of X- and Z-axis backward movement, the duration of X- and Z-axis backward movement being displayed on the display screen.

* * * * *